US012041955B2

(12) United States Patent
Woo

(10) Patent No.: US 12,041,955 B2
(45) Date of Patent: Jul. 23, 2024

(54) ROASTING APPARATUS AND CONTROL METHOD THEREFOR

(71) Applicant: STRONGHOLD TECHNOLOGY, INC., Seoul (KR)

(72) Inventor: Jong Wook Woo, Seoul (KR)

(73) Assignee: STRONGHOLD TECHNOLOGY, INC., Seoul (KR)

( * ) Notice: Subject to any disclaimer, the term of this patent is extended or adjusted under 35 U.S.C. 154(b) by 0 days.

(21) Appl. No.: 18/224,469

(22) Filed: Jul. 20, 2023

(65) Prior Publication Data

US 2023/0354871 A1  Nov. 9, 2023

Related U.S. Application Data

(63) Continuation of application No. 17/225,851, filed on Apr. 8, 2021, now Pat. No. 11,717,015, which is a
(Continued)

(30) Foreign Application Priority Data

Oct. 11, 2018 (KR) .................. 10-2018-0120922
Oct. 11, 2018 (KR) .................. 10-2018-0120923
Oct. 8, 2019 (KR) .................. 10-2019-0124306

(51) Int. Cl.
  *A23N 12/12* (2006.01)
  *H05B 1/02* (2006.01)

(52) U.S. Cl.
  CPC ......... *A23N 12/125* (2013.01); *H05B 1/0269* (2013.01)

(58) Field of Classification Search
  CPC ...... A23N 12/08; A23N 12/083; A23N 12/10; A23N 12/12; A23N 12/125; H05B 1/0269; A23F 5/04; A23F 5/046; A47J 31/42
  See application file for complete search history.

(56) References Cited

U.S. PATENT DOCUMENTS 5,386,764 A * 2/1995 Ratajczek ............. A23N 12/10
                                                 34/560
6,260,479 B1   7/2001 Friedrich et al.
(Continued)

FOREIGN PATENT DOCUMENTS

CA      2318684 A1    3/2001
CN    202774062 U     3/2013
(Continued)

OTHER PUBLICATIONS

International Search Report of PCT/KR2019/013156 dated Jan. 17, 2020.
(Continued)

*Primary Examiner* — Hung D Nguyen
(74) *Attorney, Agent, or Firm* — K&L Gates LLP

(57) ABSTRACT

The present disclosure relates to a roasting apparatus and a method of controlling the roasting apparatus, and more particularly, to a roasting apparatus for roasting objects while stirring the objects in a roasting chamber, and a method of controlling the roasting apparatus. An roasting apparatus for heating objects according to the present disclosure includes a roasting chamber part which includes: a cylindrical roasting chamber that extends in a vertical direction and has an internal space in which the objects are stirred; and a rotary stirring part that rotates to stir the objects received in the roasting chamber and rotates about a stirring axis defined in the vertical direction. The roasting apparatus further includes heat source parts which supply heat to the roasting chamber part.

16 Claims, 10 Drawing Sheets

Related U.S. Application Data continuation of application No. PCT/KR2019/013156, filed on Oct. 8, 2019.

(56) References Cited

U.S. PATENT DOCUMENTS

| | | | |
|---|---|---|---|
| 2013/0276637 A1 | 10/2013 | Stordy et al. | |
| 2013/0344207 A1* | 12/2013 | Ludwig | A23N 12/10 |
| | | | 426/233 |
| 2016/0016181 A1* | 1/2016 | Lathrop | A23G 1/06 |
| | | | 96/61 |

FOREIGN PATENT DOCUMENTS

| | | |
|---|---|---|
| CN | 103156266 A | 6/2013 |
| CN | 103653210 A | 3/2014 |
| CN | 105662119 A | 6/2016 |
| CN | 107242769 A | 10/2017 |
| DE | 202017002951 U1 | 8/2017 |
| DE | 202017002951 U1 * | 8/2017 |
| FR | 1001374 A | 2/1952 |
| GB | 2182234 A | 5/1987 |
| KR | 10-0963695 B1 | 6/2010 |
| KR | 10-2011-0082656 A * | 7/2011 |
| KR | 20110082656 A | 7/2011 |
| KR | 10-2011-0087793 A | 8/2011 |
| KR | 10-2012-0096835 A | 8/2012 |
| KR | 10-2014-0107850 A | 9/2014 |
| KR | 10-2016-0036864 A | 4/2016 |
| KR | 10-1760118 B1 * | 7/2017 |
| KR | 10-1760118 B1 | 7/2017 |
| KR | 10-1782417 B1 | 9/2017 |
| KR | 10-1782417 B1 * | 9/2017 |
| KR | 10-1861606 B1 | 5/2018 |
| TW | 201605359 A | 2/2016 |

OTHER PUBLICATIONS

Chinese Office Action dated Dec. 2, 2021 in Chinese Patent Application No. 201980007381.7.

Chinese Office Action dated May 20, 2022 in Chinese Patent Application No. 201980007381.7.

Chinese Office Action dated Sep. 5, 2022 in Chinese Patent Application No. 201980007381.7.

Ma Yan, China Great Dictionary of Baked Foods, published by China Light Industry Press, May 2007, p. 158.

Tian Wenfu et al. Cement Clinker Calcination Process and Operation, published by China Building Material Industry Press, Sep. 2015, p. 233.

Extended European Search Report dated Aug. 11, 2022 in European Patent Application No. 19872035.1.

* cited by examiner

ROASTING APPARATUS AND CONTROL METHOD THEREFOR

TECHNICAL FIELD

The present disclosure relates to a roasting apparatus and a method of controlling the roasting apparatus, and more particularly, to a roasting apparatus for roasting objects while stirring the objects in a roasting chamber, and a method of controlling the roasting apparatus.

BACKGROUND ART

Recently, there have been introduced grain roasters or coffee roasters that may easily and automatically roast grains such as coffee beans in a professional coffee shop or at home.

Such a coffee roaster automatically roasts coffee beans in a roasting operation mode set by using a temperature sensor and a microcomputer.

An automatic coffee roaster for business use in the related art mainly has a horizontally rotating drum and rotates the drum forward and backward to stir coffee beans so that the coffee beans are evenly roasted well (Korean Patent Nos. 342091, 369539, 463341, 804106, 887985, and 963695, and Korean Patent Application Laid-Open Nos. 2009-30655 and 2010-38802).

However, because the automatic coffee roaster in the related art heats the horizontally rotating drum by using only a single heat source such as direct gas combustion, there is a problem in that a large amount of time is required for preheating and it is impossible to cope with various roasting environments.

DISCLOSURE

Technical Problem

An object of the present disclosure is to provide a roasting apparatus and a method of controlling the same, which reduce a preheating operation time for roasting, thereby further improving productivity.

Another object of the present disclosure is to provide a roasting apparatus and a method of controlling the same, which more effectively measure a process of roasting objects, thereby performing roasting desired by a user.

Technical Solution

One aspect of the present disclosure provides a roasting apparatus for heating objects, the roasting apparatus including: a roasting chamber part which includes: a cylindrical roasting chamber that extends in a vertical direction and has an internal space in which the objects are stirred; and a rotary stirring part that rotates to stir the objects received in the roasting chamber and rotates about a stirring axis defined in the vertical direction; and heat source parts which supply heat to the roasting chamber part and include: a first heat source part that provides convection heat to an interior of the roasting chamber by providing hot air flow to the roasting chamber; a second heat source part that is in contact with a surface of the roasting chamber and provides conduction heat to the roasting chamber in a conduction manner; and a third heat source part that provides radiant heat to the interior of the roasting chamber.

The second heat source part may include a second heat source part body which surrounds an outer circumferential surface of the roasting chamber in a state in which the second heat source part body is in contact with the outer circumferential surface of the roasting chamber, and the second heat source part body may be made of a ceramic material.

The roasting chamber may have at least one roasting chamber side through hole which communicates with the outside, and the second heat source part body may have a second heat source part body side through hole which is formed at a position corresponding to the roasting chamber side through hole.

The roasting apparatus may further include a conduction temperature measurement unit which measures a temperature of the second heat source part, in which a conduction temperature measurement probe of the conduction temperature measurement unit may be in contact with both an inner surface of a third heat source part body and the outer circumferential surface of the roasting chamber in a state in which the conduction temperature measurement probe is disposed between the second heat source part and the roasting chamber, and in which the conduction temperature measurement probe of the conduction temperature measurement unit may be disposed at a position most distant from the roasting chamber side through hole and the second heat source part body side through hole.

The roasting apparatus may further include a radiant temperature measurement unit which measures temperatures of the objects received in the internal space of the roasting chamber, in which the radiant temperature measurement unit may be directed toward the internal space of the roasting chamber and disposed on an upper unit disposed at an upper side of the roasting chamber.

The upper unit may include an upper unit body having a circular shape, the upper unit body may have a measurement hole which penetrates the upper unit body in the vertical direction, the radiant temperature measurement unit may include: a sensing part which measures a temperature; and a filter part which is disposed in front of the sensing part and transmits light in a predetermined wavelength band, and the sensing part and the filter part may be aligned with the measurement hole.

The radiant temperature measurement unit may include: a first bracket which is fixed to the upper unit body and has a first through hole formed therein; a second bracket which has one side being in contact with and fixed to the first bracket, and a second through hole that is formed therein and aligned with the first through hole and into which the sensing part is fitted; and a board which is fixed to the other side of the second bracket and on which the sensing part is mounted, the first through hole and the second through hole may be aligned with the measurement hole, and the filter part may be installed between the first bracket and the second bracket.

The first bracket may include: a first bracket body which defines an external shape of the first bracket and has the first through hole disposed at a center thereof; and a pair of protruding portions which protrude upward from one side of the first bracket body, a recessed space may be provided between the protruding portions, the second bracket may include: a second bracket body which defines an external shape of the second bracket and has the second through hole disposed at a center thereof; and an insertion portion which is formed at one side of the second bracket body and fitted into the recessed space of the first bracket, and the filter part may be in close contact between the recessed space of the first bracket and the insertion portion of the second bracket in a state in which the filter part is aligned with the first through hole disposed in the recessed space.

An elastic member may be disposed in at least one of an area between the filter part and the first bracket and an area between the filter part and the second bracket.

A cylindrical guide part may be provided on a lower surface of the upper unit and may protrude downward while surrounding the measurement hole, and the guide part may be aligned with the measurement hole.

The first heat source part may include: a flow tube through which air flows; and a heating unit which is disposed at one side of the flow tube and heats the flowing air, the third heat source part may include a lamp unit which emits the radiant heat, the upper unit may include: a first heat source arrangement hole to which the heating unit is fixed and through which heated air flows to the internal space of the roasting chamber; and a third heat source arrangement hole to which the lamp unit is fixed and through which the radiant heat emitted from the lamp unit is transferred to the internal space of the roasting chamber, the pair of lamp units and the pair of third heat source arrangement holes may be provided, and the first heat source arrangement hole may be disposed between the pair of third heat source arrangement holes.

The first heat source arrangement hole may have a circular shape, and the third heat source arrangement hole may have a rectangular shape.

The first heat source part, the second heat source part, and the third heat source part may be sequentially activated so that the first heat source part provides the convection heat to an internal space of the roasting chamber first, the second heat source part provides the conduction heat to the internal space of the roasting chamber, and then the third heat source part provides the radiant heat to the internal space of the roasting chamber, during a preheating process of raising a temperature of the internal space of the roasting chamber from room temperature to a predetermined temperature.

Another aspect according to the present disclosure provides a method of controlling a roasting apparatus including: a roasting chamber part which includes: a cylindrical roasting chamber that extends in a vertical direction and has an internal space in which the objects are stirred; and a rotary stirring part that rotates to stir the objects received in the roasting chamber and rotates about a stirring axis defined in the vertical direction; and heat source parts which supply heat to the roasting chamber part and include: a first heat source part that provides convection heat to an interior of the roasting chamber by providing hot air flow to the roasting chamber; a second heat source part that is in contact with a surface of the roasting chamber and provides conduction heat to the roasting chamber in a conduction manner; and a third heat source part that provides radiant heat to the interior of the roasting chamber, the method including: a first heat source preheating operation step of providing, by the first heat source part, the hot air flow to the internal space of the roasting chamber; a second heat source preheating operation step of providing, by the second heat source part, the conduction heat to the internal space of the roasting chamber when a measured first preheating temperature is equal to or higher than a first reference temperature in the first heat source preheating operation step; and a third heat source preheating operation step of providing, by the third heat source part, the radiant heat to the internal space of the roasting chamber when a measured second preheating temperature is equal to or higher than a second reference temperature in the second heat source preheating operation step.

The method may further include at least one of: a first heat source temperature maintaining operation step of providing, by the first heat source part, the convection heat so that the first preheating temperature is maintained as the first reference temperature, when the measured first preheating temperature is equal to or higher than the first reference temperature in the first heat source preheating operation step; a second heat source temperature maintaining operation step of providing, by the second heat source part, the conduction heat so that the second preheating temperature is maintained as the second reference temperature, when the measured second preheating temperature is equal to or higher than the second reference temperature in the second heat source preheating operation step; and a third heat source temperature maintaining operation step of providing, by the third heat source part, the radiant heat so that a third preheating temperature is maintained as a third reference temperature, when the measured third preheating temperature is equal to or higher than the third reference temperature in the third heat source preheating operation step.

The preheating operation may be ended when a fourth preheating temperature, which is a temperature measured outside the roasting chamber, is raised to a fourth reference temperature in the third heat source temperature maintaining operation step.

The roasting apparatus may further include: a convection temperature measurement unit which is disposed in a flow path of the hot air flow supplied to the roasting chamber by the first heat source part, and measures a convection temperature of the hot air flow; a conduction temperature measurement unit which has a conduction temperature measurement probe disposed between the second heat source part and an outer circumferential surface of the roasting chamber and measures a conduction temperature of the second heat source part; and a radiant temperature measurement unit which measures a radiant temperature of the internal space of the roasting chamber, and the convection temperature of the hot air flow, the conduction temperature, temperatures of the objects, and an internal temperature of the roasting chamber may be the first preheating temperature, the second preheating temperature, and the third preheating temperature, respectively.

The first preheating temperature, the second preheating temperature, and the third preheating temperature may be measured at different positions.

Advantageous Effects

According to the proposed embodiment, it is possible to provide the roasting apparatus and the method of controlling the same, which reduce a preheating operation time for roasting, thereby further improving productivity.

The roasting apparatus and the method of controlling the same may more effectively measure the process of roasting objects, thereby performing roasting desired by the user.

BEST MODE

Figure 1:
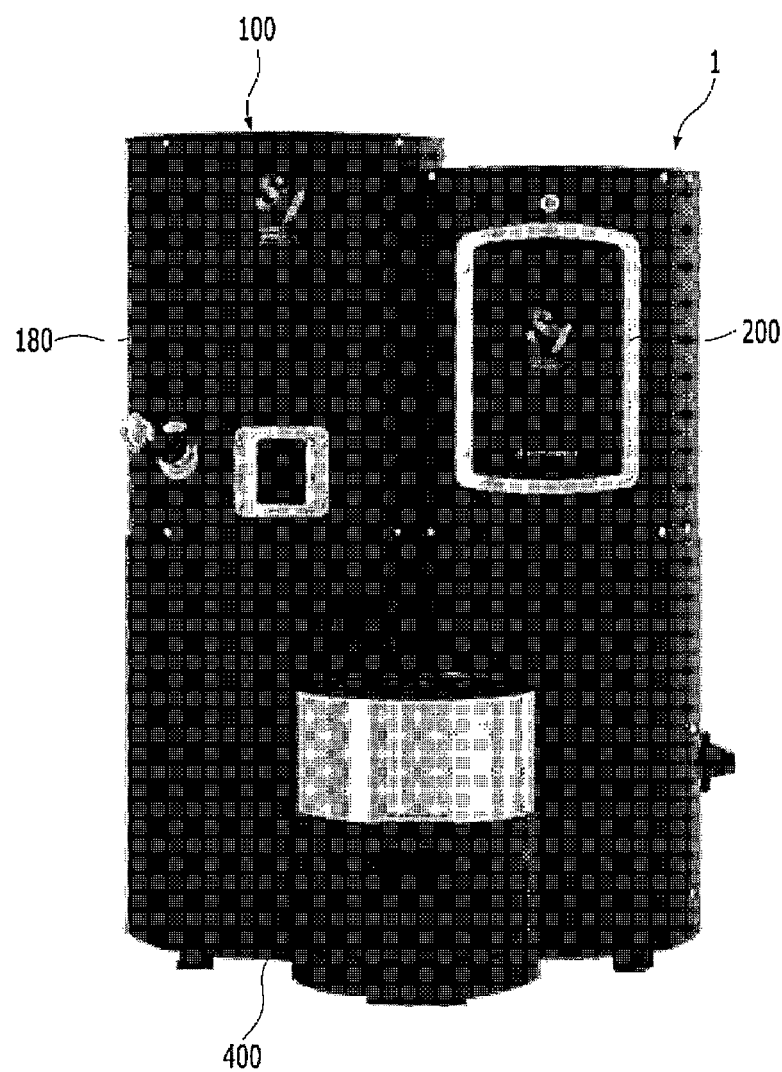
FIG. 1 is a view illustrating a roasting apparatus according to an embodiment of the present disclosure.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art to which the present disclosure pertains can fully understand the scope of the present disclosure. The present disclosure will be defined only by the scope of the appended claims.

Terms "first", "second", and the like may be used to describe various constituent elements, but the constituent elements are of course not limited by these terms. These terms are merely used to distinguish one constituent element from another constituent element. Therefore, the first constituent element mentioned hereinafter may of course be the second constituent element within the technical spirit of the present disclosure.

Throughout the specification, the same reference numerals denote the same constituent elements.

Respective features of several exemplary embodiments of the present disclosure may be partially or entirely coupled to or combined with each other, and as sufficiently appreciated by those skilled in the art, various technical cooperation and operations may be made, and the respective exemplary embodiments may be carried out independently of each other or carried out together correlatively.

Potential effects, which may be expected by technical features of the present disclosure that are not specifically mentioned in the specification of the present disclosure, are treated as being described in the present specification, and the present embodiments are provided to more completely explain the present disclosure to those skilled in the art. Therefore, the contents illustrated in the drawings may be exaggeratingly expressed in comparison with actual implementation of the present disclosure, and a detailed description of a configuration will be summarized or omitted when it is determined that the description may unnecessarily obscure the subject matter of the present disclosure.

Hereinafter, the embodiments of the present disclosure will be described in detail with reference to the accompanying drawings.

Figure 2:
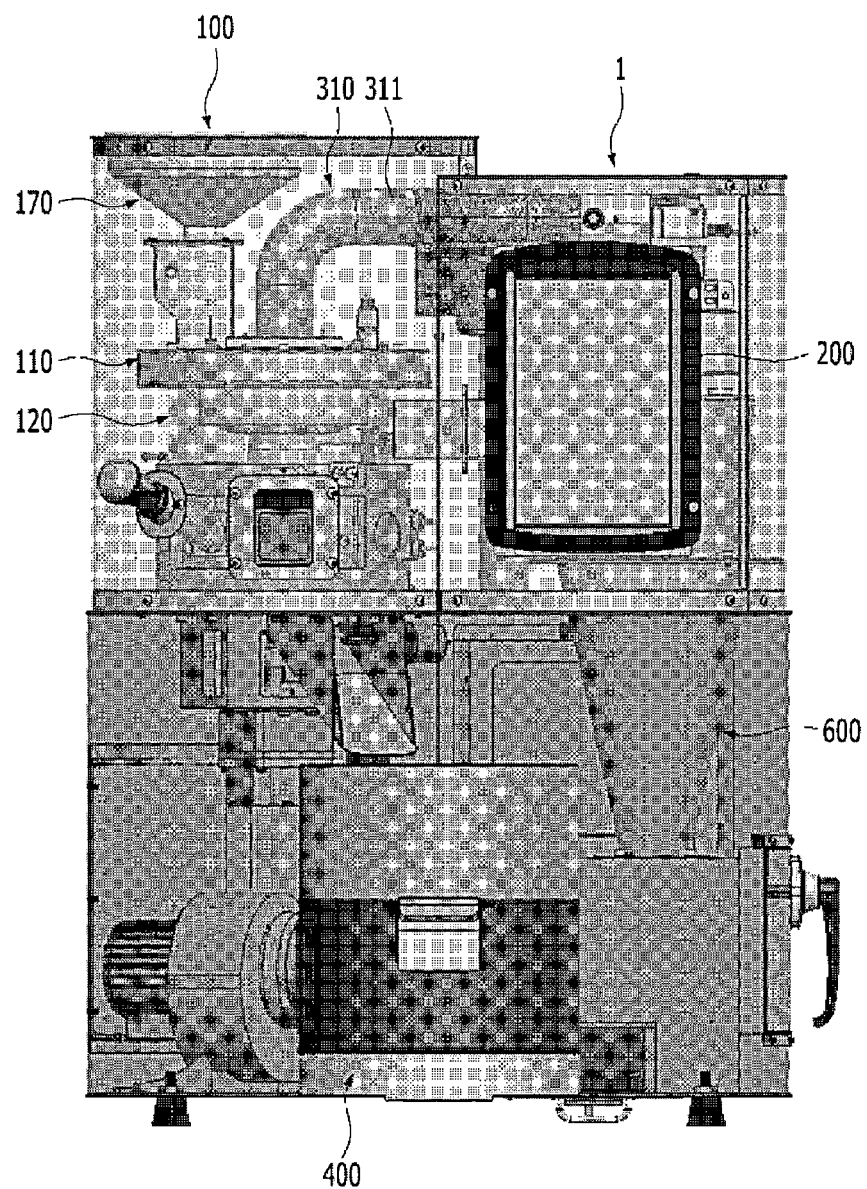
FIG. 2 is a view illustrating a state in which an internal configuration of the roasting apparatus illustrated in FIG. 1 is projected.
Figure 3:
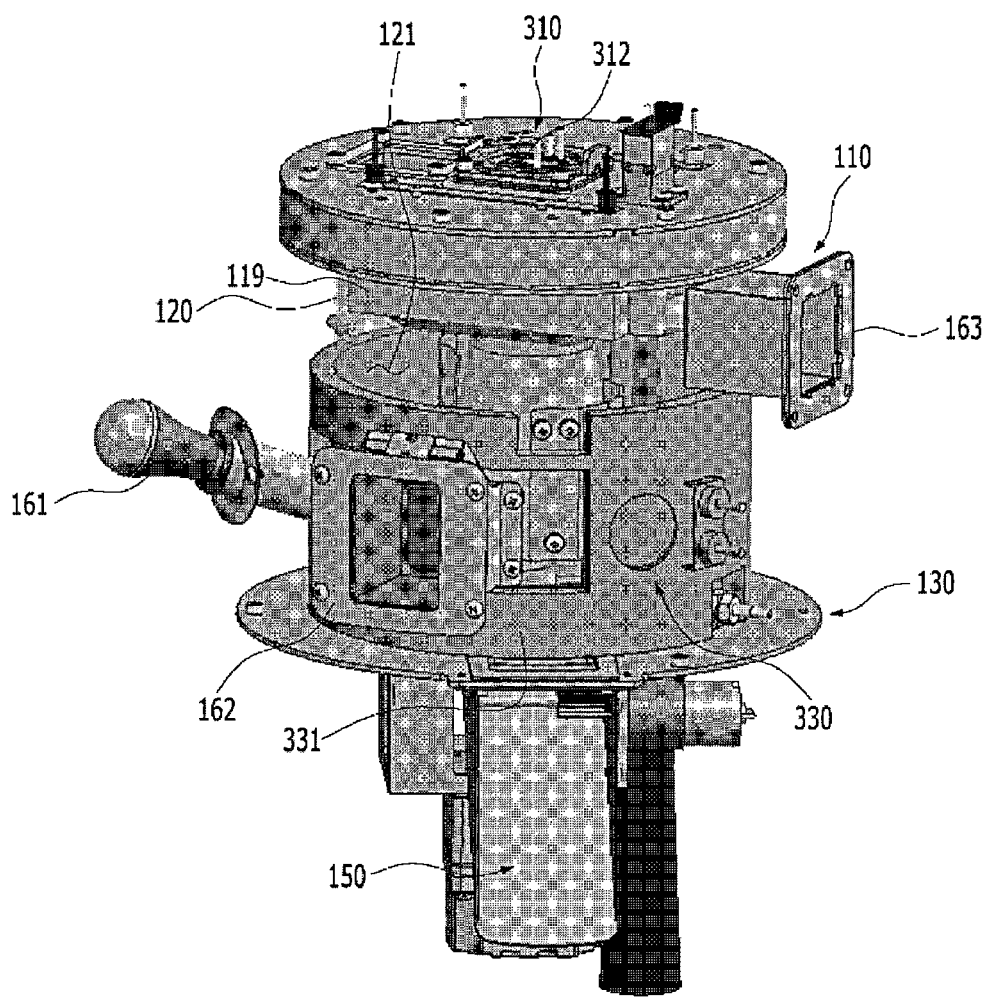
FIG. 3 is a view illustrating a configuration of a roasting chamber part of the roasting apparatus illustrated in FIG. 1.
Figure 4:
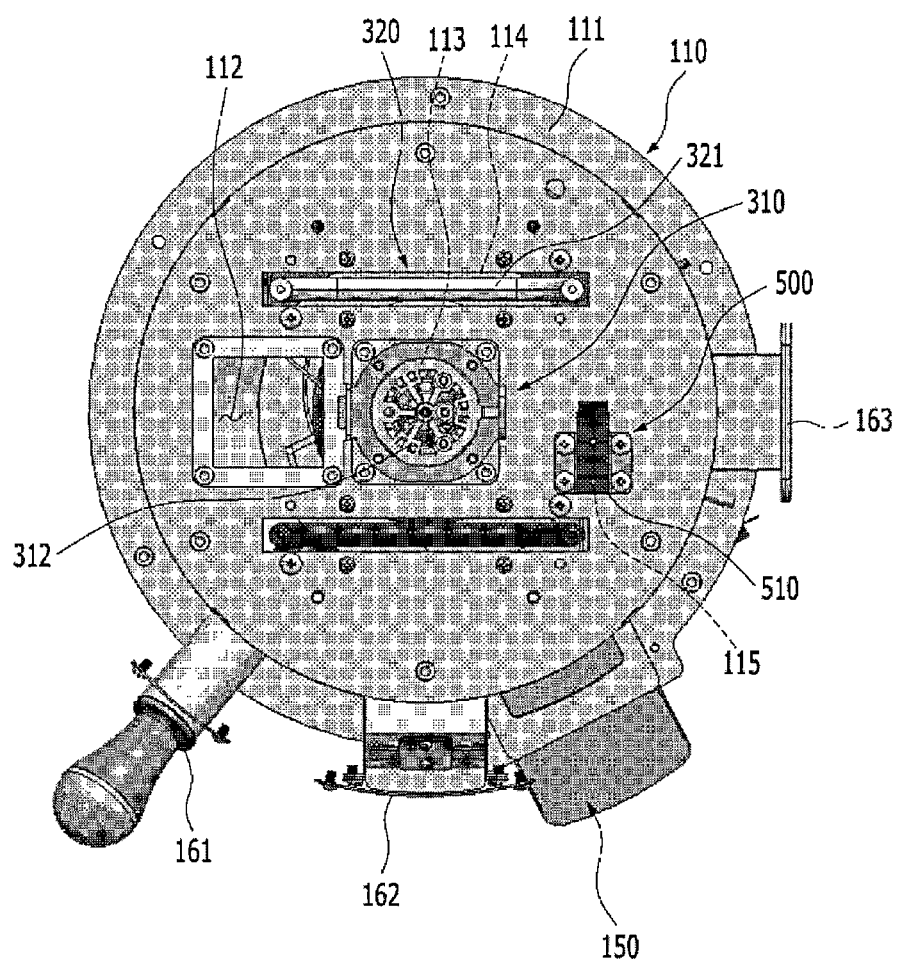
FIG. 4 is a view illustrating the roasting chamber part illustrated in FIG. 3 when viewed from above.
Figure 5:
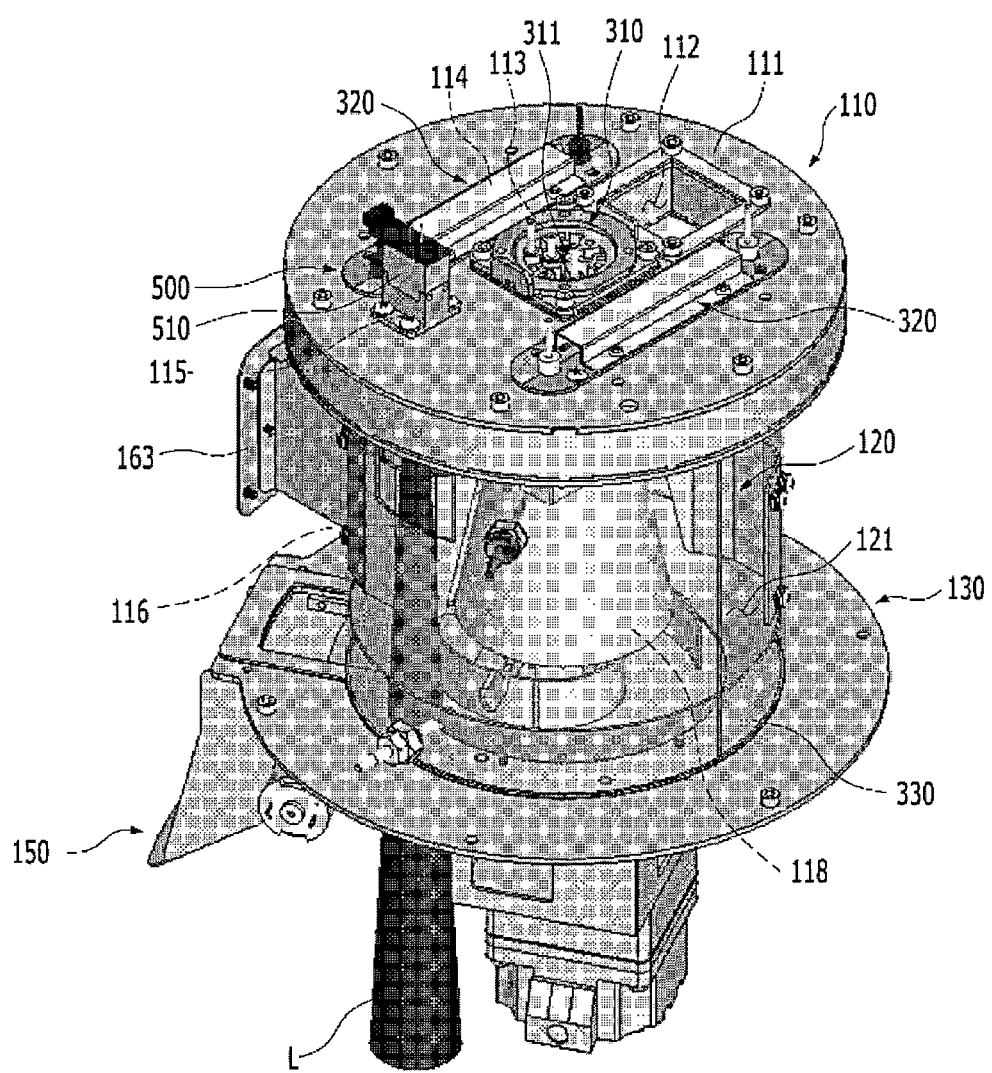
FIG. 5 is a view illustrating a state in which a third heat source part is removed from the roasting chamber part illustrated in FIG. 3.
Figure 6:
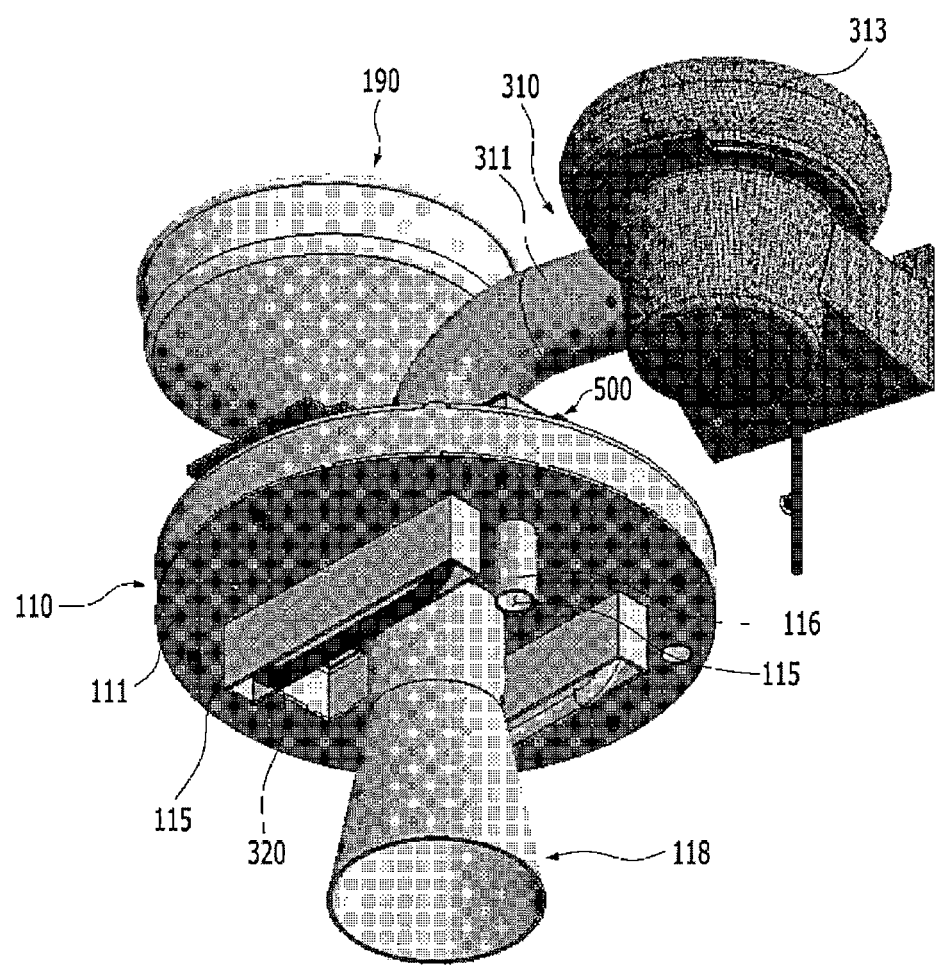
FIG. 6 is a view illustrating an upper unit of the roasting chamber part illustrated in FIG. 3.
Figure 7:
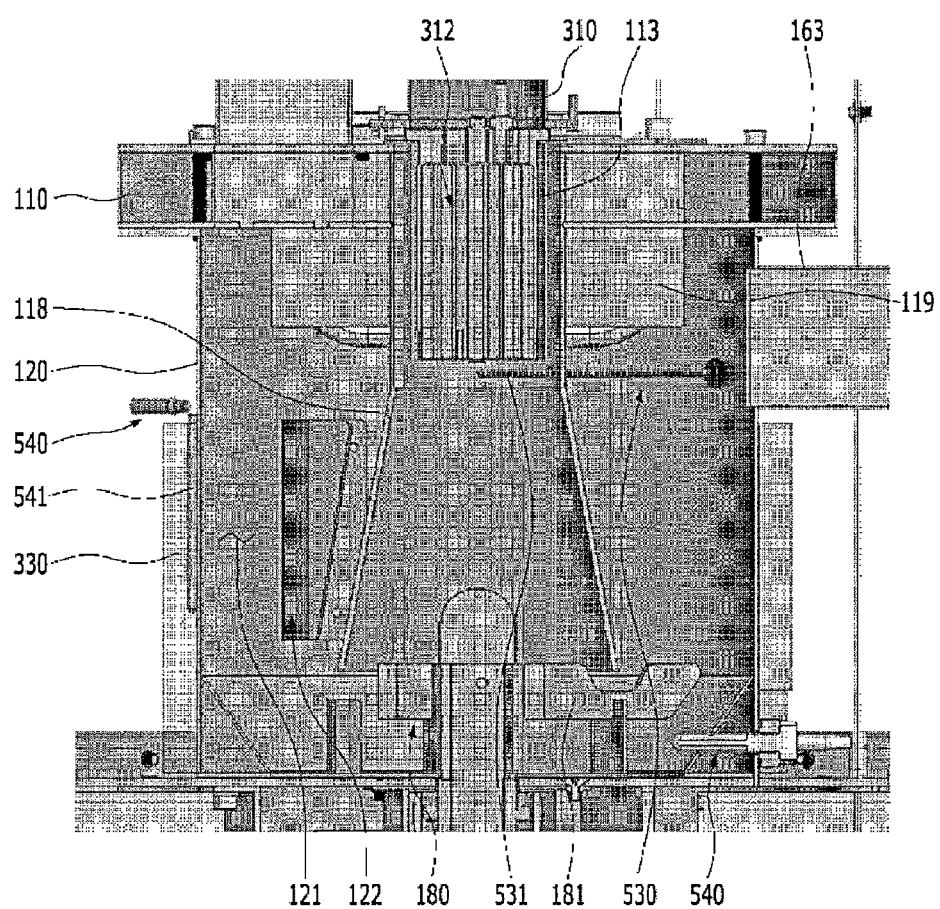
FIG. 7 is a view illustrating a cross section of the roasting chamber part illustrated in FIG. 3.

FIG. 1 is a view illustrating a roasting apparatus according to an embodiment of the present disclosure, and FIG. 2 is a view illustrating a state in which an internal configuration of the roasting apparatus illustrated in FIG. 1 is projected. FIG. 3 is a view illustrating a configuration of a roasting chamber part of the roasting apparatus illustrated in FIG. 1, and FIG. 4 is a view illustrating the roasting chamber part illustrated in FIG. 3 when viewed from above. FIG. 5 is a view illustrating a state in which a third heat source part is removed from the roasting chamber part illustrated in FIG. 3. FIG. 6 is a view illustrating an upper unit of the roasting chamber part illustrated in FIG. 3, and FIG. 7 is a view illustrating a cross section of the roasting chamber part illustrated in FIG. 3. FIG. 2 illustrates a state in which a casing 190 is rendered in a semi-transparent manner and an internal configuration of a roasting apparatus 1 is projected outward in a state in which the casing 190 is installed which defines an external shape of the roasting apparatus 1.

Referring to FIGS. 1 to 7, the roasting apparatus 1 according to the embodiment of the present disclosure refers to an apparatus for roasting objects such as coffee beans by heating the objects. The roasting apparatus 1 includes a roasting chamber part 100 in which the objects are received and roasted, a control panel part 200 which displays information about a roasting situation of the objects and receives an operating signal from a user, an object storage part 400 which stores the objects completely roasted in the roasting chamber part 100, and heat source parts 310, 320, and 330 which supply heat to the roasting chamber part 100. The roasting chamber part 100 is surrounded by the casing 190 made of metal.

In more detail, the roasting chamber part 100 includes a cylindrical roasting chamber 120 which extend in a vertical direction and has an internal space 121 in which the objects are stirred, a rotary stirring part 180 which includes stirring blade units 181 that rotates to stir the objects received in the roasting chamber 120, an upper unit 110 that has a circular shape and is disposed at an upper side of the roasting chamber 120, a lower unit 130 that has a circular shape and is disposed at a lower side of the roasting chamber 120, and a discharge unit 150 which communicates with the internal space 121 of the roasting chamber 120 and is selectively opened to discharge, to the outside, the objects completely roasted in the internal space 121 of the roasting chamber 120.

The roasting chamber 120 may be formed in a cylindrical shape extending in the vertical direction, and a stationary blade 122 may be formed on an inner surface of the roasting chamber 120 so as to stir the objects more smoothly. The stationary blade 122 protrudes from the inner surface of the roasting chamber 120, and the stationary blade 122 is shaped such that a protruding height of the stationary blade 122 is increased from the lower side to the upper side of the roasting chamber 120.

The discharge unit 150 may include a door portion (not illustrated) which is opened or closed based on an operating signal of a control unit (not illustrated), and a lever portion (not illustrated) which is used by a user to forcibly open the door portion in an emergency situation, regardless of a control signal of the control unit. The discharge unit 150 extends to be inclined toward the object storage part 400, such that when the door portion of the discharge unit 150 is opened, the roasted objects may be supplied to the object storage part 400.

Further, the stirring blade units 181 of the rotary stirring part 180 are rotated about a stirring axis defined in the vertical direction. Therefore, in the state in which the roasting chamber part 100 according to the present embodiment extends in the vertical direction, the stirring blade units 181 of the rotary stirring part 180 are rotated about the stirring axis defined in the vertical direction to stir the objects. This is advantageous in that the objects may be more efficiently roasted and the roasting apparatus 1 may be more efficiently disposed.

The heat source parts 310, 320, and 330 include a first heat source part 310 which provides convection heat to an interior of the roasting chamber 120 by providing a hot air flow to the roasting chamber 120, a second heat source part 330 which is in contact with a surface of the roasting chamber 120 and provides conduction heat to the roasting chamber 120 in a conduction manner, and a third heat source part 320 which provides radiant heat to the interior of the roasting chamber 120.

The first heat source part 310 includes a flow tube 311 through which air flows, and a heating unit 312 which is disposed at one side of the flow tube 311 and heats the flowing air. The flow tube 311 is connected to a blow unit 313 for supplying air and is supplied with the air, and one side of the heating unit 312 and one side of the flow tube 311 are connected to the upper unit 110. For example, the heating unit 312 has a plurality of heating elements which are disposed in the form of a mesh or a coil, and the air is heated while passing through the heating elements.

The second heat source part 330 includes a second heat source part body which surround an outer circumferential surface of the roasting chamber 120 in a state in which the second heat source part body is in contact with the outer circumferential surface of the roasting chamber 120. The second heat source part body may be a band heater made of a ceramic material.

Meanwhile, the roasting chamber 120 has at least one roasting chamber side through hole which communicates with the outside, and the second heat source part body has a second heat source part body side through hole which is formed at a position corresponding to the roasting chamber side through hole.

For example, the roasting apparatus 1 further includes a sample collection unit 161 which collects a sample during a roasting process, and a window unit 162 which enables the user to visually check the roasting process in the roasting chamber 120. The sample collection unit 161 and the window unit 162 are installed in the roasting chamber side through holes and the second heat source part body side through holes. An air discharge port 163 is formed at the upper side of the roasting chamber 120 and communicates with the internal space of the roasting chamber 120. The second heat source part 330 is not disposed in an area of the air discharge port 163. That is, the second heat source part 330 is installed only up to a predetermined height from the outer circumferential surface of the roasting chamber 120, and an object receiving limit line of the internal space 121 of the roasting chamber 120, in which the objects are received, may be defined to the height at which the second heat source part 320 is installed.

Dust (bean pods and the like), which generated from the objects during the roasting process, is delivered to a dust collection unit 600 through the air discharge port 163. The dust collection unit 600 discharges the air to the outside, and stores the dust in a dust storage (not illustrated) therein.

The third heat source part 320 may include a lamp unit 321 which emits radiant heat and is installed on the upper unit 110 and provides the radiant heat to the internal space 121 of the roasting chamber 120. For example, the lamp unit 321 may be a halogen lamp.

Meanwhile, the upper unit 110 includes an upper unit body 111 having a circular shape. The upper unit body 111 has a first heat source arrangement hole 113 to which the heating unit 312 of the first heat source part 310 is fixed and through which heated air flows to the internal space 121 of the roasting chamber 120, a third heat source arrangement hole 114 to which the lamp unit 321 of the third heat source part 320 is fixed and through which the radiant heat emitted from the lamp unit 321 is transferred to the internal space 121 of the roasting chamber 120, and an object supply hole 112 which is connected to a hopper unit 170 of the roasting apparatus 1 and through which the objects are inputted into the internal space 121 of the roasting chamber 120. In addition, a diffuser part 118 is provided at a lower side of the upper unit 110, guides the hot air flow supplied from the first heat source part 310, and has a diameter that increases downward. The diffuser part 118 extends from a lower surface of the upper unit 110 to the rotary stirring part 180 disposed at the lower side of the roasting chamber 120. A recessed groove (not illustrated) may be formed in the stirring blade unit 181 of the rotary stirring part 180 in order to avoid interference with the diffuser part 118.

The pair of lamp units 321 of the third heat source part 320 and the pair of third heat source arrangement holes 114 may be provided, and the first heat source arrangement hole 113 is provided between the pair of third heat source arrangement holes 114. The first heat source arrangement hole 113 disposed at a center of the upper unit body 111 has a circular shape, and the third heat source arrangement hole 114 has a rectangular shape. Meanwhile, a third heat source guide unit 119 is provided on the upper unit body 111 according to the present embodiment, surrounds the third heat source arrangement hole 114 and extends downward. The third heat source guide unit 119 has a rectangular cross-section shape corresponding to the third heat source arrangement hole 114. The third heat source guide unit 119 may prevent a surface of the lamp unit 321 of the third heat source 320 from being contaminated by the dust generated from the objects during the roasting process in the roasting chamber 120.

The roasting apparatus 1 according to the present embodiment further includes measurement units 510, 520, and 530 which measure heat source supply temperatures of the heat source parts 310, 320, and 330 that supply heat to the roasting chamber 120.

A radiant temperature measurement unit 510 measures radiant temperatures of the objects received in the internal space 121 of the roasting chamber 120. The radiant temperature measurement unit 510 is directed toward the internal space 121 of the roasting chamber 120 and disposed on the upper unit 110 disposed at the upper side of the roasting chamber 120. In this case, the upper unit body 111 has a measurement hole 115 which penetrates the upper unit body 111 in the vertical direction. The measurement hole 115 is positioned at an eccentric position from the center of the upper unit body 111. The radiant temperature measurement unit 510 according to the present embodiment measures a change in temperature of the objects by detecting infrared rays, emitted from surfaces of the objects, during the roasting process. Therefore, the roasting apparatus 1 according to the embodiment of the present disclosure may advantageous accurately detect the temperatures of the objects and accurately perform the roasting desired by the user in comparison with a roasting apparatus in the related art which detects only a change in temperature in the roasting chamber 120. During a process of performing a preheating operation of preheating the roasting chamber 120 before inputting the objects into the roasting chamber 120, the radiant temperature measurement unit 510 may detect a temperature of a surface of the lower unit 130 which defines a bottom surface of the roasting chamber 120.

As described below, a plurality of experiments was performed on installation positions of the radiant temperature measurement unit 510 according to the present embodiment. In the present embodiment, the radiant temperature measurement unit 510 was installed at an optimum installation position directed toward the lower side from the upper unit 110, that is, directed toward the internal space 121 of the roasting chamber 120 from the upper unit 110.

TABLE 1

| Installation Positions | Scratch of filter | Thermal damage to filter | Measurement Accuracy |
|---|---|---|---|
| Upper portion of roasting chamber | X | X | High |
| Central portion of roasting chamber | ◯ | X | High |
| Lower portion of roasting chamber | ◯ | ◯ | Low |

Hereinafter, the radiant temperature measurement unit 510 according to the present embodiment will be described in more detail.

Figure 8:
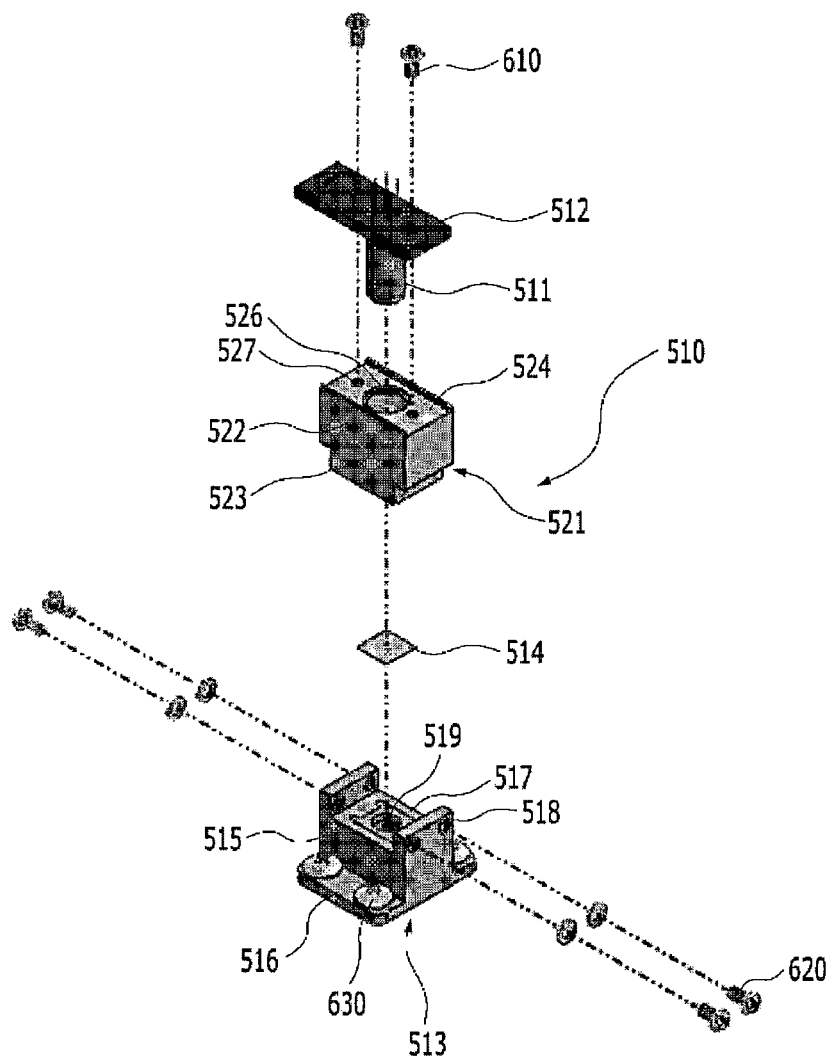
FIG. 8 is a view illustrating a state in which a first temperature detection unit of the roasting apparatus illustrated in FIG. 1 is disassembled.
Figure 9:
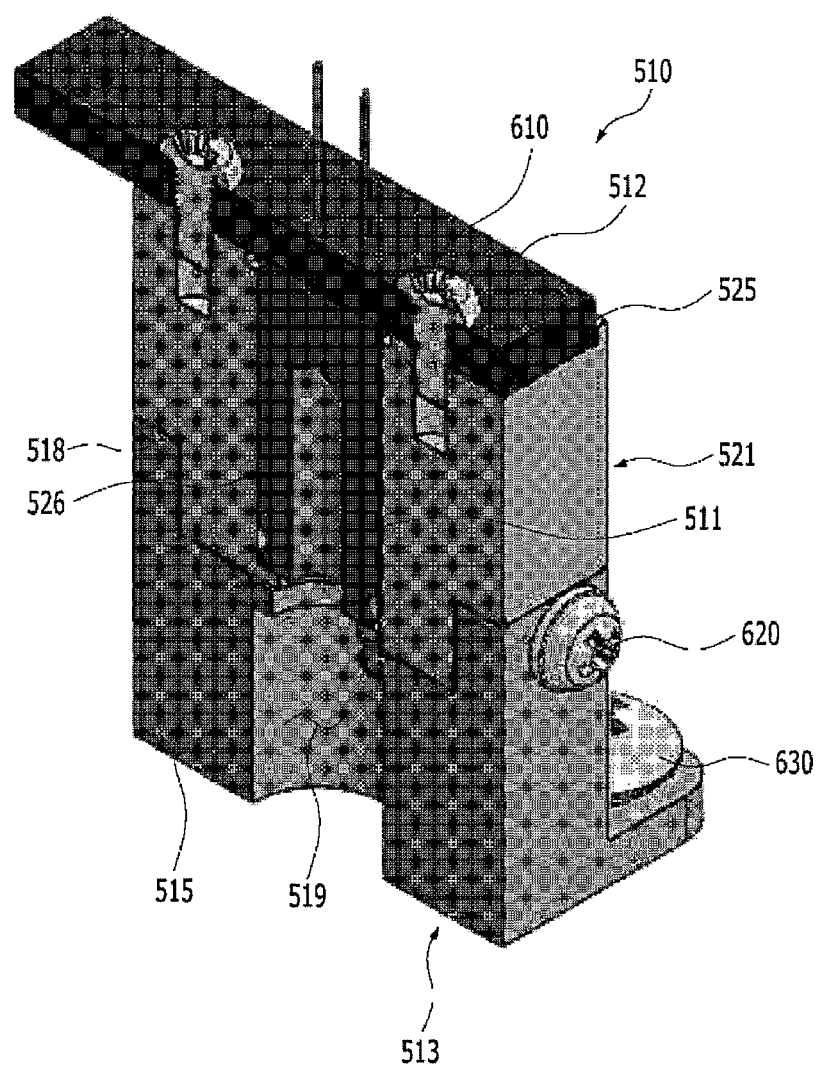
FIG. 9 is a view illustrating a cross section of the first temperature detection unit illustrated in FIG. 8.

FIG. 8 is a view illustrating a state in which a first temperature detection unit of the roasting apparatus illustrated in FIG. 1 is disassembled, and FIG. 9 is a view illustrating a cross section of the first temperature detection unit illustrated in FIG. 8.

Referring to FIGS. 8 and 9, the radiant temperature measurement unit 510 includes a sensing part 511 which measures a temperature, a filter part 514 which is disposed in front of the sensing part 511 and transmits light in a predetermined wavelength band, a first bracket 513 which is fixed to the upper unit body 111 of the roasting chamber part 100 and has a first through hole 519 formed therein, a second bracket 521 which has one side being in contact with and fixed to the first bracket 513 and a second through hole 526 that is formed therein and aligned with the first through hole 519 and into which the sensing part 511 is fitted, and a board 512 which is fixed to the other side of the second bracket 521 and on which a sensing part 511 is mounted.

In this case, the sensing part 511, the first through hole 519, the second through hole 526, and the filter part 514 are aligned with the measurement hole 115 of the upper unit 110, and the filter part 514 is installed between the first bracket 513 and the second bracket 521.

The sensing part 511 has a cylindrical shape and senses infrared rays emitted from the objects. The sensing part 511 extends in a direction identical to the penetration direction of the measurement hole 115. For example, the sensing part 511 may be an IR sensor.

For example, the filter part 514 may be made of a material, such as glass or silicone, which is transparent and less deformed by heat. The filter part 514 transmits only the light beams in an infrared band among the light beams transmitted to the sensing part 511 from the roasting chamber 120.

The first bracket 513 includes a first bracket body 515 which defines an external shape of the first bracket 513 and has the first through hole 519 disposed at a center thereof, and a pair of protruding portions 518 which protrude upward from one side of the first bracket body 515. A recessed space 517 is provided between the protruding portions 518, and a pair of first bracket fixing portion 516 protrudes from a lower side of the first bracket body 515 and is penetrated by first fastening members 630 fastened to the upper unit body 111.

The second bracket 521 includes a second bracket body 522 which defines an external shape of the second bracket 521, an insertion portion 523 which is formed at one side of the second bracket body 522 and fitted into the recessed space of the first bracket 513, a board seating surface 524 which is disposed on an upper surface of the second bracket 521 and on which the board 512 is seated, and a pair of board fixing protrusions 525 which protrude upward from a rim of the board seating surface 524 and by which one side and the other side of the board 512 are caught.

In a state in which the filter part 514 is aligned with the first through hole 519 disposed in the recessed space 517, the filter part 514 is in close contact between the recessed space 517 of the first bracket 513 and the insertion portion 523 of the second bracket 521. In a state in which the insertion portion 523 of the second bracket 521 is inserted into the recessed space 517 of the first bracket 513, the first bracket 513 and the second bracket 521 may be fixed by second fastening members 620 which integrally penetrate the protruding portions 518 of the first bracket 513 and the insertion portion 523 of the second bracket 521. That is, in the state in which the first through hole 519 is sealed by the filter part 514, the first bracket 513 and the second bracket 521 are securely fixed to each other with the filter part 514 interposed therebetween, and as a result, it is possible to prevent foreign substances in the internal space 121 of the roasting chamber 120 from entering the inside and the outside the radiant temperature measurement unit 510 through the first through hole 519 which communicates with the measurement hole 115 of the roasting chamber 120. Meanwhile, an elastic member (not illustrated) made of rubber or silicone may be disposed in at least one of an area between the filter part 514 and the first bracket 513 and an area between the filter part 514 and the second bracket 521 and securely seal the space and inhibit damage to the filter part 514.

The sensing part 511 is fitted into the second through hole 526 of the second bracket 521. In a state in which the board 512 is seated on the seating surface 524, third fastening members 610 may be fixed to fastening holes 527 of the second bracket 521 through the board 512 and securely fix the board 512 and the second bracket 521.

The board 512 may be a PCB having a plate shape. A roasting chamber outside temperature measurement element (not illustrated) may be provided on the board 512 and measure an outside temperature of the roasting chamber 120 at a position at which the board 512 is installed, that is, an outside temperature of a portion adjacent to the roasting chamber 120. That is, the radiant temperature measurement unit 510 according to the present embodiment may measure the radiant temperature of the internal space 121 of the roasting chamber 120 and the temperature of the external space of the roasting chamber 120.

Further, a cylindrical guide part 116 is provided on the lower surface of the upper unit 110 and protrudes downward while surrounding the measurement hole 115, and the guide part 116 is aligned with the measurement hole 115. That is, since the guide part 116 surrounds the measurement hole 115 and protrudes to the internal space 121 of the roasting chamber 120, it is possible to prevent the dust, which is generated in the internal space 121 of the roasting chamber 120 during the roasting process, from entering the measurement hole 115 and contaminating the surface of the filter part 514. The sensing part 511 may emit the light for measurement to the internal space 121 of the roasting chamber 120 or receive the light emitted from the objects through the measurement hole 115 surrounded by the guide part 116.

Referring back to FIGS. 3 to 7, the measurement units 510, 520, 530, 540, and 550 of the roasting apparatus 1 according to the present embodiment further include a convection temperature measurement unit 530 which is disposed in a flow path of the hot air flow supplied to the roasting chamber 120 by the first heat source part 310, and measures a convection temperature of the hot air flow, a conduction temperature measurement unit 540 which has a conduction temperature measurement probe 541 disposed between the second heat source part 330 and the outer circumferential surface of the roasting chamber 120 and measures a conduction temperature of the second heat source part 330, and a contact temperature measurement unit 550 which is installed at the lower side of the roasting chamber 120, is in direct contact with the objects during the roasting process and measures the temperatures of the objects.

In this case, a convection temperature measurement probe 531 of the convection temperature measurement unit 530 penetrates a lateral portion of the roasting chamber 120 and the diffuser part 118, and a tip portion of the convection temperature measurement probe 531 may be positioned at a downstream side of the heating unit 312 and measure the temperature of the hot air flow passing through the heating unit 312.

In a state in which the conduction temperature measurement probe 541 of the conduction temperature measurement unit 540 is disposed between the second heat source part 330 and the roasting chamber 120, the conduction temperature measurement probe 541 of the conduction temperature measurement unit 540 is in contact with both an inner surface of the second heat source part body 331 and the outer circumferential surface of the roasting chamber 120. In this case, the conduction temperature measurement probe 541 of the conduction temperature measurement unit 540 is disposed at a position most distant from the roasting chamber side through hole and the second heat source part body side through hole. That is, the roasting chamber side through hole and the second heat source part body side through hole communicate with the outside, and the heating element of the second heat source part 330 is not disposed at the corresponding position, such that the measured temperature is relatively high at the position most distant from the roasting chamber side through hole and the second heat source part body side through hole. Therefore, the conduction temperature measurement probe 541 of the conduction temperature measurement unit 540 is disposed at the position most distant from the roasting chamber side through hole and the second heat source part body side through hole, such that the conduction temperature measurement probe 541 measures the conduction temperature based on the highest temperature.

Hereinafter, a method of controlling the roasting apparatus according to the present embodiment, particularly, a method of controlling a preheating operation will be described in detail.

Figure 10:
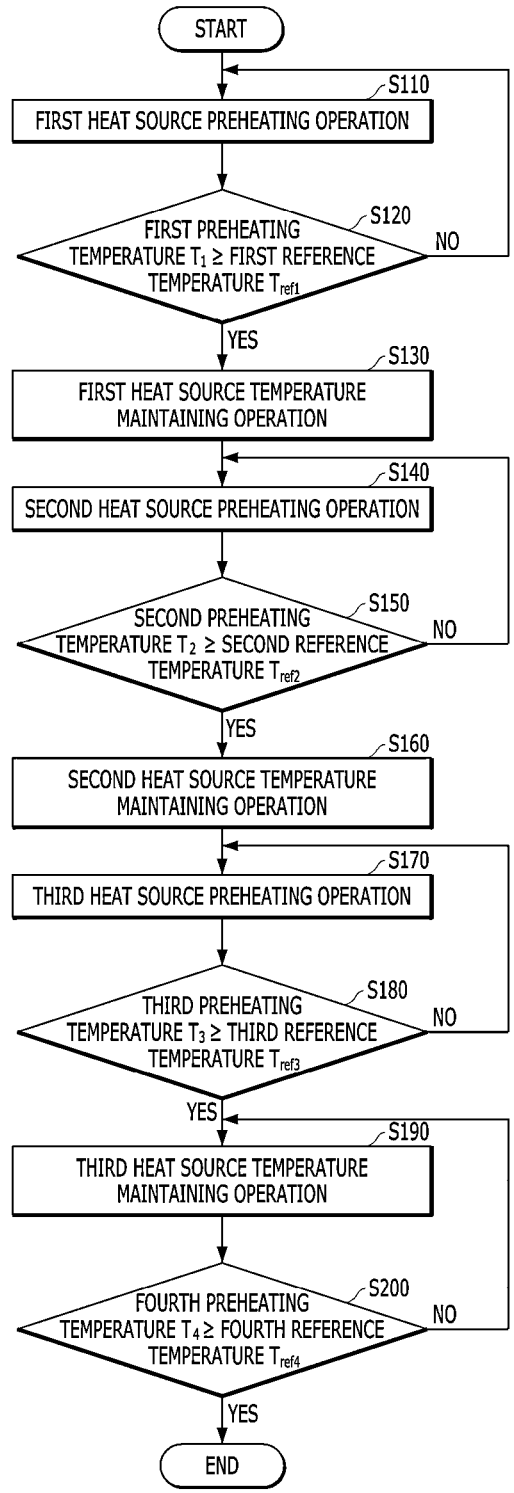
FIG. 10 is a view illustrating a method of controlling the roasting apparatus illustrated in FIG. 1.

FIG. 10 is a view illustrating a method of controlling the roasting apparatus illustrated in FIG. 1.

Referring to FIG. 10, before the objects are inputted into the roasting apparatus 1 according to the present embodiment and the objects are roasted, a preheating operation is performed to raise a temperature of the internal space 121 of the roasting chamber 120 to a preheating temperature at a desired level. The roasting apparatus 1 according to the present embodiment may complexly use the three heat sources to perform the preheating operation, thereby more quickly raising the temperature of the internal space 121 to a desired preheating temperature. After the preheating operation is ended, the roasting apparatus 1 according to the present embodiment may differently control the three heat sources depending on the user's preference, thereby performing roasting to implement flavor desired by the user.

First, a first heat source preheating operation step S110 is performed, in which the first heat source part provides the hot air flow to the internal space of the roasting chamber.

Next, when a measured first preheating temperature $T_1$ is equal to or higher than a first reference temperature $T_{ref1}$ (S120) in the first heat source preheating operation step S110, a first heat source temperature maintaining operation step S130 is performed, in which the first heat source part 310 provides the convection heat so that the first preheating temperature $T_1$ is maintained as the first reference temperature $T_{ref1}$. In this case, the first preheating temperature $T_1$ according to the present embodiment may be the convection temperature of the hot air flow measured by the convection temperature measurement unit 530, and in the first heat source temperature maintaining operation step S130, electric power, at a level lower than the first heat source preheating operation step S110, is supplied to the first heat source part 310.

Further, when the measured first preheating temperature $T_1$ is lower than the first reference temperature $T_{ref1}$ S120, the first heat source preheating operation step S110 is repeatedly performed.

Next, a second heat source preheating operation step S130 is performed, in which the second heat source part 330 provides the conduction heat to the internal space 121 of the roasting chamber 120.

When a measured second preheating temperature $T_2$ is equal to or higher than a second reference temperature $T_{ref2}$ (S150) in the second heat source preheating operation step S130, a second heat source temperature maintaining operation step S160 is performed (S160), in which the second heat source part 330 provides the conduction heat so that the second preheating temperature $T_2$ is maintained as the second reference temperature $T_{ref2}$. In this case, the second preheating temperature $T_2$ according to the present embodiment may be the conduction temperature of the second heat source part 330 measured by the conduction temperature measurement unit 540, and in the second heat source temperature maintaining operation step S160, electric power, at a level lower than the second heat source preheating operation step S140, is supplied to the second heat source part 330.

When the measured second preheating temperature $T_2$ is lower than the second reference temperature $T_{ref2}$ (S150), the second heat source preheating operation step S140 is repeatedly performed.

Next, a third heat source preheating operation step S170 is performed, in which the third heat source part 320 provides the radiant heat to the internal space 121 of the roasting chamber 120.

When a measured third preheating temperature $T_3$ is equal to or higher than a third reference temperature $T_{ref3}$ (S190) in the third heat source preheating operation step S170, a third heat source temperature maintaining operation step S190 is performed, in which the third heat source part 320 provides the radiant heat so that the third preheating temperature $T_3$ is maintained as the third reference temperature $T_{ref3}$. In this case, the third preheating temperature $T_3$ according to the present embodiment may be the radiant temperature of the internal space 121 of the roasting chamber 120 measured by the radiant temperature measurement unit 510, and in the third heat source temperature maintaining operation step S190, electric power, at a level lower than the third heat source preheating operation step S170, is supplied to the third heat source part 320.

Further, when the measured third preheating temperature $T_3$ is lower than the third reference temperature $T_{ref3}$ (S180), the third heat source preheating operation step S170 is repeatedly performed.

Next, when a fourth preheating temperature $T_4$, which is a temperature measured outside the roasting chamber 120, is raised to a fourth reference temperature $T_{ref4}$ (S200), the preheating operation is ended.

Further, when the measured fourth preheating temperature $T_4$ is lower than the fourth reference temperature $T_{ref4}$ (S200), the third heat source temperature maintaining operation S190 is repeatedly performed. In this case, the first heat source temperature maintaining operation step S130 and the second heat source temperature maintaining operation step S160 are also continuously performed.

That is, the first preheating temperature $T_1$, the second preheating temperature $T_2$, the third preheating temperature $T_3$, and the fourth preheating temperature $T_4$ according to the present embodiment are measured at different positions. The first preheating temperature $T_1$, the second preheating temperature $T_2$, and the third preheating temperature $T_3$ are the convection temperature, the conduction temperature, and the radiant temperature of the heat transferred from the first heat source part 310, the second heat source part 330, and the third heat source part 320. The fourth preheating temperature $T_4$ is the temperature of the external space adjacent to the roasting chamber 120, that is, a temperature by which the temperature of the internal space 121 of the roasting chamber 120 may be estimated.

According to the proposed embodiment, it is possible to provide the roasting apparatus and the method of controlling the same, which reduce a preheating operation time for roasting, thereby further improving productivity.

The roasting apparatus and the method of controlling the same may more effectively measure the process of roasting objects, thereby performing roasting desired by the user.

While the exemplary embodiments of the present disclosure have been described above, the present disclosure is not limited thereto, and various modifications can be made and carried out within the scope of the claims, the detailed description of the invention, and the accompanying drawings, and also fall within the scope of the present disclosure.

MODE FOR INVENTION

Modes for carrying out the invention have been described in the best mode for carrying out the invention.

INDUSTRIAL APPLICABILITY

The embodiments according to the present disclosure relate to the roasting apparatus and the method of controlling the same and are repeatable and industrially applicable in respect to the roasting apparatus for roasting objects such as coffee beans or grains.

What is claimed is:

1. A roasting apparatus for heating objects, the roasting apparatus comprising:
a casing configured to define an external shape of the roasting apparatus;
a roasting chamber part installed in the casing and comprising:
a cylindrical roasting chamber that extends in a vertical direction and has an internal space in which the objects is stirred;
a rotary stirring part that rotates to stir the object received in the roasting chamber and rotates about a stirring axis defined in the vertical direction; and
heat source parts configured to supply heat to the roasting chamber part,
wherein the heat source parts comprise a conduction-type heat source part configured to be in contact with an outer surface of the roasting chamber and provide conductive heat to the roasting chamber,
wherein the conduction-type heat source part comprises a conduction-type heat source part body configured to surround an outer peripheral surface of the roasting chamber in a state in which the conduction-type heat source part body is in contact with the outer peripheral surface of the roasting chamber, and
wherein the conduction-type heat source part body is made of a ceramic material, and the roasting chamber is made of metal.

2. The roasting apparatus of claim 1, wherein the roasting chamber has at least one roasting chamber side through-hole which communicates with the outside, and the conduction-type heat source part body has a conduction-type heat source part body side through-hole which is formed at a position corresponding to the roasting chamber side through-hole.

3. The roasting apparatus of claim 2, further comprising:
a conduction temperature measurement unit configured to measure a temperature of the conduction-type heat source part,
wherein a conduction temperature measurement probe of the conduction temperature measurement unit is in contact with both an inner surface of the conduction-type heat source part body and the outer peripheral surface of the roasting chamber in a state in which the conduction temperature measurement probe is disposed between the conduction-type heat source part and the roasting chamber, and
wherein the conduction temperature measurement probe of the conduction temperature measurement unit is disposed at a position most distant from the roasting chamber side through-hole and the conduction-type heat source part body side through-hole.

4. The roasting apparatus of claim 3, further comprising:
a contact temperature measurement unit installed at a lower side of the roasting chamber, configured to come into direct contact with the object during a roasting process, and measure temperatures of the object,
wherein the contact temperature measurement unit is inserted into a through-hole formed through both the conduction-type heat source part body and the outer peripheral surface of the roasting chamber, and
wherein a contact temperature measurement probe of the contact temperature measurement unit is disposed to be spaced apart from the conduction-type heat source part body.

5. The roasting apparatus of claim 2, wherein the roasting chamber side through-hole comprises a first roasting chamber side through-hole and a second roasting chamber side through-hole,
wherein the conduction-type heat source part body side through-hole comprises a first conduction-type heat source part body side through-hole and a second conduction-type heat source part body side through-hole,
wherein a sample collection unit, which collects a sample during a roasting process, is detachably inserted into the first roasting chamber side through-hole and the first conduction-type heat source part body side through-hole, and
wherein a window unit, which is made of a transparent material, is installed in the casing, disposed in parallel with the second roasting chamber side through-hole and the second conduction-type heat source part body side through-hole, and configured to block the second roasting chamber side through-hole and the second conduction-type heat source part body side through-hole.

6. The roasting apparatus of claim 2, wherein an area in which the conduction-type heat source part body is in contact with the outer peripheral surface of the roasting chamber is 60% to 80% of an overall area of the outer peripheral surface of the roasting chamber.

7. The roasting apparatus of claim 1, wherein the heat source parts further comprise:
a convection-type heat source part configured to provide convective heat to an interior of the roasting chamber by providing a hot airflow to the roasting chamber; and
at least one radiation-type heat source part configured to provide radiant heat to the interior of the roasting chamber,
wherein a space between the casing and the roasting chamber is heated to a space preheating temperature lower than a chamber preheating temperature during a process in which the roasting chamber is preheated to the preset chamber preheating temperature, and
wherein the amount of increase in temperature per time in the space between the casing and the roasting chamber generated by the conduction-type heat source part is larger than the amount of increase in temperature per time in the space between the casing and the roasting chamber generated by another heat source part, except for the conduction-type heat source part.

8. The roasting apparatus of claim 7, wherein heating operation initiation time points of the convection-type heat source part, the conduction-type heat source part, and the radiation-type heat source parts during the process of preheating the roasting chamber are different.

9. The roasting apparatus of claim 1, comprising:
a radiant temperature measurement unit configured to detect a temperature of the roasting chamber part or object on the basis of infrared rays emitted from an inner surface of the roasting chamber part heated by the heat source part or infrared rays emitted from a surface of the object,
wherein the radiant temperature measurement unit comprises:
a sensing part configured to measure a temperature; and
a filter part which is disposed in front of the sensing part and transmits light in a predetermined wavelength band,
wherein the sensing part and the filter part are aligned with a measurement hole, and
wherein the filter part blocks light in a visible wavelength band, transmits only light in an infrared wavelength band, and prevents light, which is reflected by the inner surface of the roasting chamber part or the surface of the object, from entering the sensing part.

10. The roasting apparatus of claim 9, wherein the sensing part is disposed outside the roasting chamber and spaced apart from the interior of the roasting chamber with the filter part interposed therebetween, and the sensing part comprises a roasting chamber outside temperature measurement element configured to measure an outside temperature of the roasting chamber.

11. The roasting apparatus of claim 9, wherein the radiant temperature measurement unit is directed toward the internal space of the roasting chamber and disposed on an upper unit disposed at an upper side of the roasting chamber.

12. The roasting apparatus of claim 11, wherein a guide part is provided on a lower surface of the upper unit and protrudes downward while surrounding the measurement hole, a center hole of the guide part is aligned with the measurement hole, and an outer wall of the guide part, which surrounds the center hole, faces an inner wall of the roasting chamber.

13. The roasting apparatus of claim 9, wherein the radiant temperature measurement unit comprises:
a first bracket which is fixed to the upper unit body and has a first through hole formed therein;
a second bracket which has one side being contact with and fixed to the first bracket and a second through hole that is formed therein and aligned with the first through hole and into which the sensing part is fitted; and
a board which is fixed to the other side of the second bracket and on which the sensing part is mounted, and
wherein the first through hole and the second through hole are aligned with the measurement hole, and the filter part is installed between the first bracket and the second bracket.

14. The roasting apparatus of claim 13, wherein the first bracket comprises:
a first bracket body which defines an external shape of the first bracket and has the first through hole disposed at a center thereof; and
a pair of protruding portions which protrude upward from one side of the first bracket body,
wherein a recessed space is provided between the protruding portions,
wherein the second bracket comprises:
a second bracket body which defines an external shape of the second bracket and has the second through hole disposed at a center thereof; and
an insertion portion which is formed at one side of the second bracket body and fitted into the recessed space of the first bracket, and
wherein the filter part is in close contact between the recessed space of the first bracket and the insertion portion of the second bracket in a state in which the filter part is aligned with the first through hole disposed in the recessed space.

15. The roasting apparatus of claim 14, wherein an elastic member is disposed in at least one of an area between the filter part and the first bracket and an area between the filter part and the second bracket.

16. The roasting apparatus of claim 9, wherein the roasting apparatus computes a substantial temperature of the roasting chamber part or object on the basis of the temperature of the roasting chamber part or object detected by the radiant temperature measurement unit and the outside temperature of the roasting chamber.

* * * * *